Oct. 13, 1970 L. G. GERSON 3,533,600
COMBINATION ROTARY BEATER AND RECIPROCATING KNIFE KITCHEN APPLIANCE
Filed Oct. 18, 1966 2 Sheets-Sheet 1
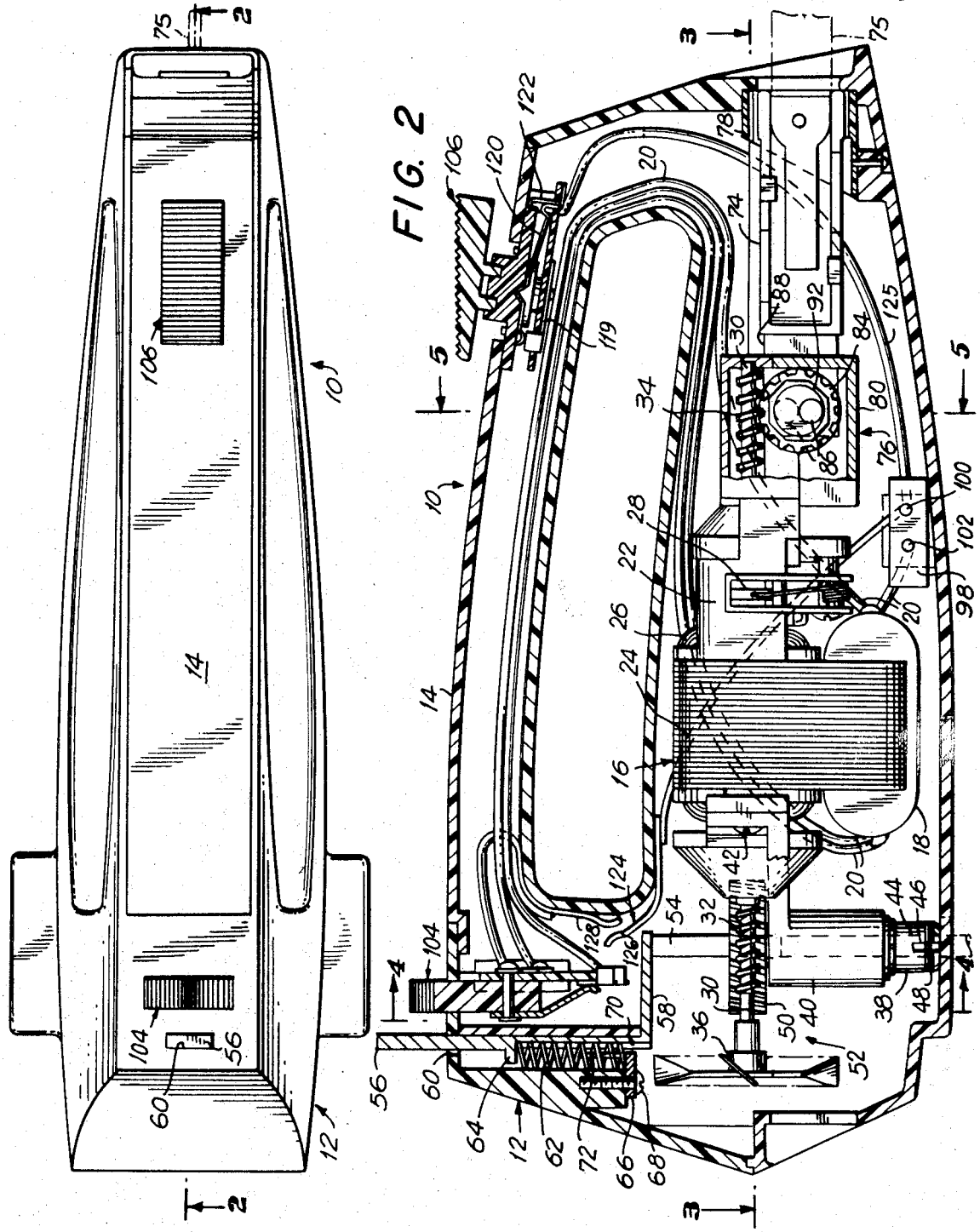
INVENTOR.
LAWRENCE G. GERSON
BY
Lackenbach & Siegel
ATTORNEYS

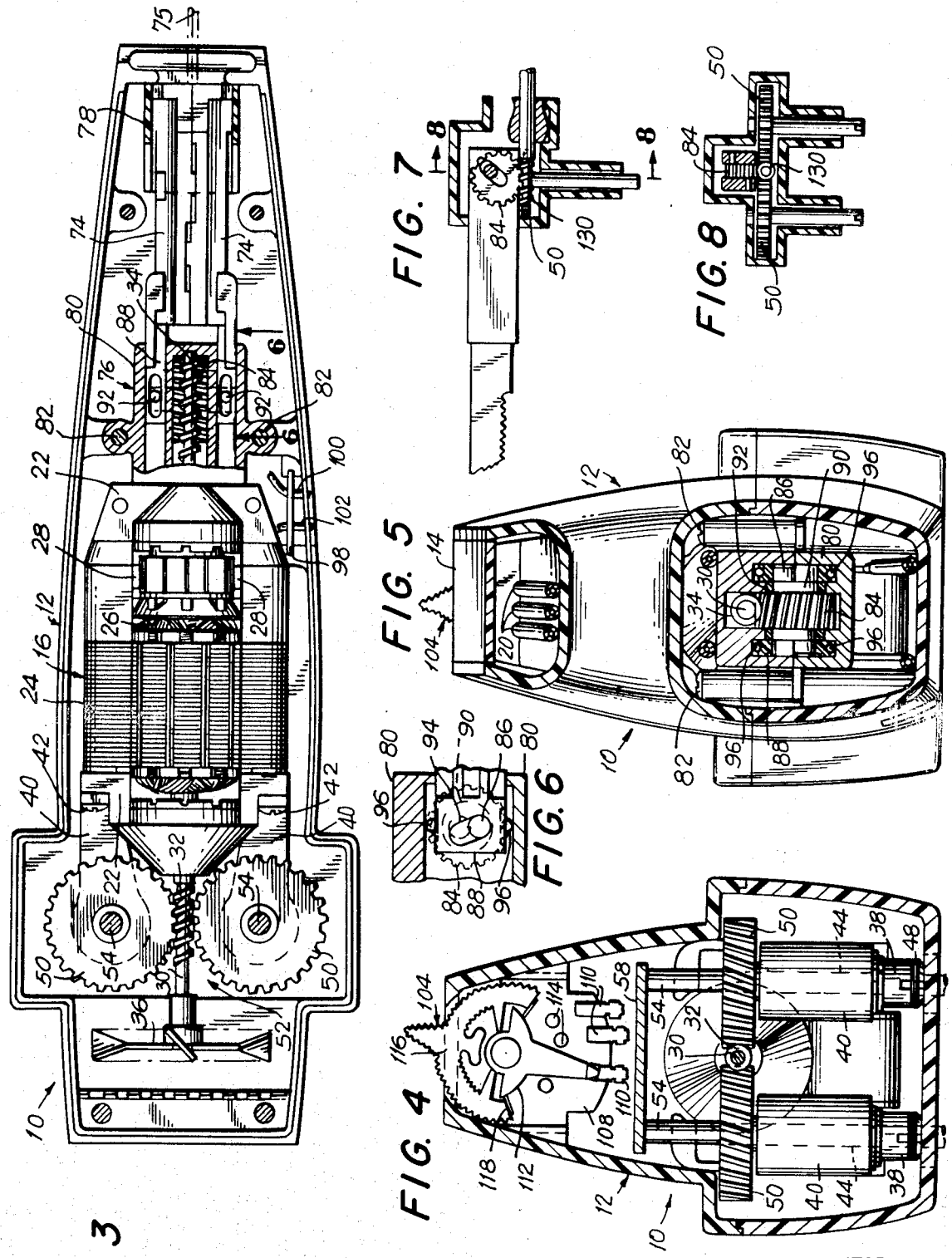

United States Patent Office 3,533,600
Patented Oct. 13, 1970

3,533,600
COMBINATION ROTARY BEATER AND RECIPROCATING KNIFE KITCHEN APPLIANCE
Lawrence G. Gerson, New York, N.Y. (869–879 Rockaway Parkway, Brooklyn, N.Y. 11236)
Filed Oct. 18, 1966, Ser. No. 587,580
Int. Cl. B01f *3/00;* H02k *7/06, 7/14*
U.S. Cl. 259—1
6 Claims

ABSTRACT OF THE DISCLOSURE

Combination rotary beater and reciprocating knife selectively driven from the output shaft of a single electric motor. The beater is controlled by maintained switch contacts, but is disabled by a second switch that is open if the beaters have not been inserted into the appliance. A third momentary switch energizes the motor to drive the pair of reciprocating knife blades. A worm gear and a pair of horizontal pinion gears drive the beaters while a worm gear and a single vertical pinion gear drive the blades through a mechanism including eccentrics on the pinion gear and oblique slots in a pair of actuators.

---

This invention relates, generally, to power operated apparatus for performing domestic culinary chores, and more particularly, to hand held power operated apparatus for performing both mixing, beating or blending and cutting or slicing type domestic culinary chores.

There are presently available hand held power operated apparatus for performing mixing, beating and blending chores and hand held power operated apparatus for performing cutting or slicing type domestic culinary chores. Heretofore, however, entirely separate and distinct apparatus was required for performing such a variety of culinary chores resulting in substantial expense and duplication of components since it is usually unnecessary to be able to perform all of these functions concurrently.

Accordingly, it is a primary object of the present invention to provide hand held, power operated apparatus which is capable of performing both mixing, beating or blending type culinary chores and cutting or slicing type culinary chores.

It is a further primary object of the present invention, in addition to the foregoing object, to provide such apparatus adapted to alternatively provide a rotary drive or mixing, beating or blending elements and a reciprocating drive for actuating cutting or slicing elements.

It is an additional primary object of the present invention, in addition to each of the foregoing objects, to provide such apparatus wherein a single motor is provided within a housing together with transmission means for providing both a rotary output for actuating mixing, beating or blending elements and a reciprocating output for actuating cutting or slicing elements.

Another primary object of the present invention, in addition to each of the foregoing objects, is to provide such apparatus wherein a single output shaft of such motor is operatively engaged with both the rotary and the reciprocating transmissions.

Another and yet still further primary object of this invention, in addition to each of the foregoing objects, is to provide such apparatus with maintained contact switch means for operating the motor during mixing, beating or blending chores and momentary contact switch means for operating such motor during cutting or slicing chores.

It is also an object of this invention, in addition to the foregoing objects, to provide interlock or automatically operated switch means for precluding inadvertent continuous operation of the motor when the apparatus being operated as a cutting or slicing apparatus.

It is another primary object of the present invention, in addition to each of the foregoing objects, to provide transmission means for providing both a rotary output and a reciprocating output from a single input shaft.

Yet another and still further primary object of this invention, in addition to each of the foregoing objects, is to provide transmission means for alternately reciprocating a pair of cutting or slicing elements constructed and arranged to continuously provide relative motion therebetween.

A still further primary object of this invention, in addition to each of the foregoing objects, is to provide such apparatus which is inexpensive to manufacture while yet being simple, efficient, and durable in use.

The invention resides in the combination, construction, arrangement and disposition of the various component parts and elements incorporated in improved hand held, power operated apparatus for performing domestic culinary chores constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

IN THE DRAWING

FIG. 1 is a top plan view of hand held, power operated apparatus constructed in accordance with the principles of the present invention;

FIG. 2 is a side elevational cross sectional view taken along line 2—2 of FIG. 1;

FIG. 3 is a top plan cross sectional view taken along line 3—3 of FIG. 2;

FIG. 4 is a front elevational cross sectional view taken along line 4—4 of FIG. 2;

FIG. 5 is a rear elevational cross sectional view taken along line 5—5 of FIG. 2;

FIG. 6 is a partial elevational cross sectional view taken along line 6—6 of FIG. 3;

FIG. 7 is a partial side elevational cross sectional view of another apparatus constructed in accordance with the principles of the present invention; and FIG. 8 is a partial end elevational cross sectional view taken along line 8—8 of FIG. 7.

Referring now to the drawing, and more particularly to FIGS. 1–6 thereof, there is shown and illustrated improved hand held power operated apparatus for performing culinary chores designated generally by the reference character 10.

The apparatus 10 comprises an elongate housing designated generally by the reference character 12, having a handle portion 14 for enabling the apparatus 10 to be readily manuipulated. A motor 16, of any conventional construction and design is secured within the housing 12 generally centrally thereof to provide for proper balance of the apparatus 10 to enable easy manipulation thereof. The motor 16 preferably is a multi-speed universal type motor, the multiple speed being provided by a tapped field portion 18 having a plurality of leads or electric wires 20 connected thereto. The motor 16 may further comprise a frame 22 structurally associated with field laminations 24, a rotatable armature 26 and brush assemblies 28. An output shaft 30 is structurally associated with the armature 26 and is rotatably positioned relative to the frame 22 by means of bearings (not shown) in a conventional manner. The output shaft 30 preferably extends longitudinally outwardly from both end portions of the frame 28 and is provided with a mixer drive worm gear 32 adjacent one end portion thereof and with a knife drive worm gear 34 adjacent the other end portion thereof. A fan assembly 36 may also be structurally associated with the shaft 30 to provide a flow of cooling air relative to the motor 16. A pair of mixer blade actuators 38 are rotatably positioned relative to the housing 12 and the motor 16, as by bearing assemblies 40 structurally associated with the motor frame 22, as by means of screws 42. The mixer actuators 38 are adapted to drivingly engage mixing, beating or blending elements (not shown) in a conventional manner, as by each actuator 38 being provided with an axially extending aperture 44, a longitudinally extending slot 46 and spring means 48, whereby the lower end of each actuator 38 defines a driving chuck for engaging the respective mixing, beating or blending elements.

The upper end portion of each of the mixing blade actuators 38 is structurally associated with a mixer drive pinion gear 50. The mixer drive pinion gears are operatively engaged with the mixer drive worm gear 32 so that upon rotation of the armature 26 of the motor 16, the mixer drive pinion gears 50 and the associated mixer actuators 38 will be rotated in opposite directions. Accordingly, the mixer drive worm gear 32 and the mixer drive pinion gears 50 define a mixer drive transmission, designated generally by the reference character 52.

A mixer element ejector rod 54 is operatively associated with each of the mixing element actuators 38, as by extending downwardly into the upper end portion of the respective apertures 44 and adapted to engage the upper end of the respective mixer elements (not shown). The upper end portion of the mixer element ejector rods 54 are structurally associated together and with an ejector button 56 extending outwardly of the housing 12 by an ejector plate 58. The ejector button 56 extends outwardly of the housing 12 through an aperture 60 and is biased outwardly of the housing 12 by means, such as a compression spring 62 positioned between a shoulder 64 provided on the ejector button 56 and a spring retainer 66 structurally associated with the housing 12, as by means of a screw 68. The spring 62 is further positioned relative to the housing 12 and to the actuator button 56 by means of a longitudinally extending groove 70 provided in the actuator button 56 below the shoulder 64 and a generally upwardly extending post 72 structurally associated with the spring retainer 66 adapted to extend generally axially of the spring 62. Accordingly, upon downward movement of the actuator button 56, both of the actuator rods 54 will be moved downwardly and inwardly relative to the blade actuators 38 to eject the mixer elements therefrom.

A pair of cutting blade actuators 74 are slidably positioned relative to the housing 12 and operatively associated with the motor 16 by cutting blade transmission 76. The cutting blade actuators 74 are constructed and arranged to be operatively associated with cutting blades 75 and to be slidably positioned relative to the housing 12 by means, such as a generally rectangular slider bearing 78.

The cutting blade transmission 76 comprises a casing 80 structurally associated with the motor frame 22 and with the housing 12, as by means of screws 82. The transmission 76 further comprises a cutting drive worm gear 34, a cutting drive pinion gear 84 operatively associated with the cutting drive worm gear 34, a plurality of eccentrics 86 structurally associated with the cutting drive pinion gear 84 for rotation therewith, and a plurality of followers 88 operatively associated with the eccentrics 86 and structurally associated with the actuators 74.

A pair of shaft portions 90 are structurally associated with the cutting drive pinion gear 84 extending generally axially outwardly from both sides thereof. The shaft portions 90 are each supported within bearing members 92 structurally associated with the casing 80. The bearings 92 may, for example, comprise plain bearings. The eccentrics extend generally outwardly from the shaft portion 90 in approximately 180 degree out-of-phase relationship and engage generally oppositely obliquely disposed slots 94 provided in each of the followers 88. The followers 88 are slidably supported relative to the casing 80, as by means of ball bearing elements 96.

Accordingly, upon rotation of the output shaft 30 and rotation therewith of the cutter drive worm gear 34, the cutter drive pinion gear 84 will rotate causing the eccentrics 86 to move in a circular path about the axis of the cutter drive pinion gear 84. This circular movement of the eccentrics 86 causes movement of the eccentrics within the obliquely disposed slots 94 and hence drives the followers 86 and associated actuators 74. The movement of the followers 86 and associated actuators 74 will, as is readily apparent, be reciprocating. Since the slots 94 are obliquely disposed relative to one another, at all times, one or the other of the eccentrics 86 will be moving the associated follower 88 and, hence, there will be constant relative movement between the actuators 74 and the associated cutting blades 75, rather than the intermittent relative movement produced by conventional cutting blade drive mechanisms for reciprocating cutting blades.

The apparatus 10, and particularly the motor 16 thereof is adapted to be energized by means of a conventional line cord and accordingly is provided with a line cord connector 98 of conventional construction and design at least two connector terminals 100 and 102 positioned relative to the housing 12 and adapted to be accessible from the exterior thereof. Alternatively, the line cord may be permanently associated with the terminals 100 and 102. The terminals 100 and 102 are adapted to be electrically connected with the motor 16 alternatively by means of a maintained contact switch 104 and a monentary contact switch 106. The maintained contact switch 104 is structurally associated with the housing 12 adjacent the handle 14 thereof and positioned to be operated during beating, mixing or blending operation of the apparatus 10. The momentary contact switch 106 is likewise positioned relative to the housing 12 adjacent the handle portion 14 adapted to be operated during operation of the apparatus 10 as a cutting or slicing apparatus.

The maintained contact switch 104 preferably is a multi-contact type switch to enable the speed of the motor 16 to be varied. The momentary contact switch 106 is preferably connected only to the high speed winding of the motor 16.

The maintained contact switch 104 may be of any conventional construction and design and preferably comprises a wafer type contact assembly 108 provided with a plurality of fixed contacts or terminals 110. A movable contact member 112 is rotatably associated with the wafer 108 adapted to electrically engage the fixed contacts or terminals 110 and to engage a plurality of detent apertures 114 to position the movable contact assembly 112 relative to the contacts 110. One more detent aperture 114 is provided than the number of fixed contacts or terminals 110 to provide an off position for the maintained contact switch 104. The movable contact 112 is adapted to be moved relative to the detent apertures 114 and the fixed contacts or terminals 110 by means of an actuating handle 116 operatively associated with the movable contact 112 by means, such as a spring 118. The spring 118 provides a snap-type action to the switch 104 to enable simple and accurate operation thereof. Each of the contacts or terminals 110 is operatively electrically connected with the field wires 20 of the motor 16 and the movable contact 112 is electrically operatively connected with the terminal 100. The common connection for the field of the motor 16 is connected with the terminal 102. Accordingly, the maintained contact switch 104 provides an off position, and a plurality of on positions, each of the on positions corresponding to a different speed of the electric motor 16.

The momentary contact switch 120 may likewise be of any conventional construction and design and may, for example, comprise an actuating button 106 slidable relative to the housing 12, a fixed contact 119, a movable contact 120 and a biasing spring 122. The movable contact 120 is adapted to normaly be spaced from electrical engagement with the fixed contact 119 and to be moved into electrical engagement therewith by sliding movement of the actuating button 116. The spring 122 normally biases the actuating button 116 towards the off position. One of the fixed contacts 119 and the movable contacts 120 is electrically associated with the terminal 110 as by an electrical wire 125 and the other of the fixed contacts 119 and the movable contacts 120 is preferably electrically connected with the high speed winding of the motor 16, as by the respective one of the leads 20. Accordingly, actuation of the momentary contact switch 106 will provide energization to the motor 16 only while operating pressure is maintained on the actuating button 116 thereof and therefore, and also due to the location thereof, inadvertent continuous operation of the cutting blades 75 is effectively precluded.

To provide additional safety, and to insure against inadvertent operation of the cutting blade 75, automatic switch means 124 may be provided to electrically disconnect the maintained contact switch 104 from the motor 16 except when mixing, beating or blending elements are actually associated with the mixer actuators 38. Accordingly, such automatic switch means 124 may comprise a normally open disabling switch having a movable contact 126 biased out of engagement with a fixed contact 128 and adapted to be moved into engagement therewith by upward movement of the ejector plate 58 upon insertion of the mixer blades into the apertures 44 of the actuators 38. The automatic switch means 124 might also be associated with the cutting drive actuators 74 to operatively connect the maintained contact switch 104 with the electric motor 16 only when the cutting blades 75 are not engaged with the actuators 74.

With reference now to FIGS. 7 and 8 of the drawing, a single worm gear 130 might be provided to be operatively engaged with both the cutting drive pinion gear 84 and the mixer drive pinion gears 50, as shown, rather than with worm gears disposed at opposite ends of the output shaft 30.

It is to be understood that terminology such as "upper," "lower," "outwardly," "upwardly" and "downwardly," as used in the preceding description and in the subjoined claims, along with other similar directional terminology, is to be construed and interpreted in its normal and accepted sense. However, such terminology is not to be construed or interpreted in a limiting sense either in the preceding description or the subjoined claims, since the same is used merely to facilitate an understanding of, and to clearly set forth and particularly define the present invention.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications as may be suggested to those having the benefit of the teachings herein being intended to be reserved especially as they fall within the scope and spirit of the claims hereto appended.

What is claimed is:

1. Combination rotary beater and reciprocating knife appliance comprising a motor having an output shaft extending therethrough; cutting blade actuating means positioned relative to said motor for reciprocation thereby; mixer element actuating means positioned relative to said motor for rotation thereby; and transmission means operatively connecting said motor output shaft with said cutting blade actuating means for effecting reciprocating movement thereof and with said mixer element actuating means for effecting rotary movement thereof, said transmission means comprising a blade drive worm gear mounted for rotation with said output shaft adjacent one end portion thereof, a blade drive pinion gear engaged with said blade drive worm gear to be driven thereby, said blade drive pinion gear being disposed for rotation in a generally vertical plane, a pair of eccentrics extending outwardly of opposite sides of said blade drive pinion gear for movement therewith along a generally circular path in approximately 180 degree out-of-phase relationship, a pair of followers structurally associated with said blade actuating means, said followers being positioned on opposite sides of said blade drive pinion gear and provided with oppositely obliquely extending slots engaged with the respective eccentrics so that said blade actuating means are alternately reciprocated with continuous relative movement during operation of said motor, a mixer drive worm gear mounted for rotation with said output shaft adjacent the other end portion thereof, a pair of mixer drive pinion gears engaged with said mixer drive worm gear on opposite sides thereof and structurally associated with said mixer actuating means, said mixer drive pinion gears being disposed for rotation in a generally horizontal plane for rotating said mixer actuating means in opposite directions.

2. Apparatus as defined in claim 1 further comprising means for energizing said motor, said energizing means comprising maintained contact switch means for energizing said motor during use of said apparatus as mixing, beating, or blending apparatus and momentary contact switch means for energizing said motor during use of said apparatus as cutting or slicing apparatus.

3. Apparatus as defined in claim 2 wherein said energizing means further comprises disabling switch means connected in series with said maintained contact switch and for precluding energization of said motor by said maintained contact switch means when said apparatus is being used as cutting or slicing apparatus.

4. Hand-held combination rotary beater and reciprocating knife appliance comprising a housing having an elongated body portion and an elongated handle portion secured therewith extending in generally parallel spaced apart superposed relationship; a motor mounted within said housing adjacent one end portion thereof to provide a center of balance closer said one end portion than the other end portion and having an output shaft extending therethrough so that one end portion thereof is disposed within said one end portion of said housing and the other end portion thereof is disposed within said other end portion of said housing; mixer element actuating means carried by said housing at said one end portion thereof for rotation in a generally horizontal plane; cutting blade actuating means slidably carried by said housing at said other end portion thereof for generally longitudinal reciprocation; mixer transmission means operatively connecting said one end portion of said motor output shaft with said mixer element actuating means for effecting rotary movement thereof and cutter transmission means operatively connecting said other end portion of said motor output shaft with said cutting blade actuating means for effecting reciprocating movement thereof, said mixer transmission means comprising a mixer drive worm gear mounted for rotation with said one end portion of said motor output shaft and a pair of mixer drive pinion gears disposed in a generally horizontal plane engaged with said mixer drive worm gear on generally laterally opposite sides thereof and mounted for rotation with said mixer actuating means for driving said mixer actuating means in generally oppositely reduced velocity rotation during rotation of said output shaft and said cutter transmission comprising a cutting blade drive worm gear mounted for rotation with said other end portion of said motor output shaft, a cutting blade drive pinion gear disposed in a generally vertical plane beneath and engaged with said cutting blade worm gear, and eccentric means carried by said cutting blade drive pinion gear for reciprocating said cutting blade actuating means during rotation of said motor output shaft, the positioning of said motor, mixer actuator, and handle portion being such that the proper weight distribution and balance will prevail both during use as a beater and as a knife appliance.

5. In a combination rotary beater and reciprocating knife appliance having, a housing; a motor mounted therein having an output shaft; cutting blade actuating means slidably carried by said housing; mixer element actuating means rotatably carried by said housing; and transmission means for reciprocating said cutting blade actuating means and rotating said mixer element actuating means: a pair of eccentrics, means for supporting and driving said eccentrics from said output shaft for relative circular movement about a common axis in approximately 180 degree out-of-phase relationship, a pair of followers mounted for movement with said cutting blade actuating means and provided with oppositely obliquely extending slots disposed generally transversely the direction of sliding movement and engaged with said eccentrics so that said blade actuating means may be alternately reciprocated with continuous relative movement upon rotation of said motor output shaft.

6. In a combination rotary beater and reciprocating knife appliance having a housing; a motor mounted therein having an output shaft; cutting blade actuating means slidably carried by said housing for engaging the tangs of a pair of cutting blades; mixer element actuating means rotatably carried by said housing for engaging the shaft of a pair of mixer elements; transmission means for reciprocating said cutting blade actuating means and rotating said mixer element actuating means; and means for enabling energization of said motor; parallel connected maintained contact switch means for energizing said motor during use of said appliance as a rotary beater, momentary contact switch means for energizing said motor during use of said appliance as a reciprocating knife and disabling switch means connected in series with said maintained contact switch means for enabling energization of said motor by said maintained contact switch means only when said appliance is used as a mixer apparatus.

References Cited
UNITED STATES PATENTS

| | | | |
|---|---|---|---|
| 2,858,703 | 11/1958 | Willcox | 310—50 X |
| 3,240,966 | 3/1966 | Thompson | 310—50 |
| 3,328,001 | 6/1967 | Zasadny et al. | 259—1 |
| 2,685,435 | 8/1954 | Moore | 259—1 |
| 2,797,901 | 7/1957 | Seyfried | 259—1 |
| 3,152,398 | 10/1964 | Freeman | 30—272 |
| 3,203,096 | 8/1965 | Beisheim et al. | 30—272 |
| 3,203,095 | 8/1965 | Nelson | 30—272 |
| 3,337,954 | 8/1967 | Robison | 30—272 |

WARREN E. RAY, Primary Examiner

U.S. Cl. X.R.

310—50

Notice of Adverse Decision in Interference

In Interference No. 98,313 involving Patent No. 3,533,600, L. G. Gerson, COMBINATION ROTARY BEATER AND RECIPROCATING KNIFE KITCHEN APPLIANCE, final judgment adverse to the patentee was rendered Nov. 20, 1973, as to claim 6.

[*Official Gazette February 26, 1974.*]